United States Patent
Kim (10) Patent No.: US 8,328,098 B2
(45) Date of Patent: Dec. 11, 2012

(54) CHIP CARD WITH CONTACT AND CONTACTLESS MODES AND METHOD FOR OPERATING THE SAME

(75) Inventor: Chanyong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 12/775,900

(22) Filed: May 7, 2010

(65) Prior Publication Data

US 2010/0294843 A1    Nov. 25, 2010

(30) Foreign Application Priority Data

May 21, 2009   (KR) .................. 10-2009-0044640

(51) Int. Cl.
    *G06K 7/06* (2006.01)
(52) U.S. Cl. ....................... 235/441; 235/492
(58) Field of Classification Search .................. 235/441, 235/492

See application file for complete search history.

(56) References Cited

U.S. PATENT DOCUMENTS

| 7,255,284 | B2 | 8/2007 | Kim et al. |
| 2002/0003168 | A1* | 1/2002 | Takabayashi ............ 235/492 |
| 2006/0086806 | A1* | 4/2006 | Conraux et al. .......... 235/492 |
| 2006/0186211 | A1 | 8/2006 | Kim et al. |
| 2007/0253251 | A1* | 11/2007 | Mizushima et al. ..... 365/185.04 |

FOREIGN PATENT DOCUMENTS

| JP | 2007-179294 A | 7/2007 |
| JP | 2008-059422 A | 3/2008 |
| KR | 10-2006-0094376 A | 8/2006 |

* cited by examiner

*Primary Examiner* — Kristy A Haupt
(74) *Attorney, Agent, or Firm* — Sughrue Mion, PLLC

(57) ABSTRACT

Provided are a chip card and a method for operating the same, in which the chip card operates in a contact mode for processing contact-type data or a contactless mode for processing contactless-type data, according to priority information for contact-type data and contactless-type data, when data to be processed in a second mode is received while the chip card is operating in a first mode. Accordingly, when the chip card is operating in a first mode for processing first data, the chip card may ignore second data, to be processed in a second mode, that is received when a priority of the first data is higher than a priority of the second data. Alternatively, if the priority of the second data is higher than the priority of the first data, the chip card may switch operating modes.

23 Claims, 7 Drawing Sheets

CHIP CARD WITH CONTACT AND CONTACTLESS MODES AND METHOD FOR OPERATING THE SAME

CROSS-REFERENCE TO RELATED APPLICATIONS

This U.S. non-provisional patent application claims priority under 35 U.S.C. §119 from Korean Patent Application No. 10-2009-0044640, filed on May 21, 2009, in the Korean Intellectual Property Office, the disclosure of which is incorporated herein by reference in its entirety.

BACKGROUND

The present disclosure relates to a chip card for transmitting and/or receiving data in contact and contactless modes.

SUMMARY

The present disclosure provides a chip card that can select an operation mode.

The present disclosure also provides a chip card and a method for operating the same, which can change operation modes thereof.

In an exemplary embodiment, the chip card may include: a processor that controls the chip card to operate in a contact mode or a contactless mode, controls the chip card, when the chip card is operating in the contact mode, to switch from operating in the contact mode to operating in the contactless mode, and controls the chip card, when the chip card is operating in the contactless mode, to switch from operating in the contactless mode to operating in the contact mode.

In some exemplary embodiments, the processor may output a mode modification signal when the processor controls the chip card to operate in the contact mode and a contactless mode signal is received by the chip card or when the processor controls the chip card to operate in the contactless mode and a contact mode signal is received by the chip card.

In other exemplary embodiments, the chip card may include a register that stores priority information, the priority information indicating a priority of the contact mode and a priority of the contactless mode, and the processor may control the chip card to be supplied with power according to the priority information when the chip card is operating in the contact mode and a contactless mode signal is received by the chip card or when the chip card is operating in the contactless mode and a contact mode signal is received by the chip card.

In still other exemplary embodiments, the chip card may include one of a Universal IC Card (UICC), Subscriber Identity Module (SIM) card, and a Universal Subscriber Identity Module (USIM) card.

In other exemplary embodiments, the chip cards may include: at least one contact pad; a micro-computer that processes contact data or contactless data, the micro-computer including a register that stores priority information on the contact data and the contactless data; a contact-type interface that transmits contact data between the at least one contact pad and the micro-computer; and a contactless-type interface that transmits contactless data between at least one antenna and the micro-computer, wherein the micro-computer, when the contact data is received from the contact-type interface while the micro-computer is processing the contactless data, switches from processing the contactless data to processing the contact data according to the priority information stored in the register, and, when the contactless data is received from the contactless-type interface while the micro-computer is processing the contact data, switches from processing the contact data to processing the contactless data according to the priority information stored in the register.

In some exemplary embodiments, the chip card may include a power controller that provides a contact type power voltage received from the contact-type interface or a contactless type power voltage received from the contactless-type interface to the micro-computer.

In other exemplary embodiments, the micro-computer may include a processor that processes the contact data and the contactless data.

In still other exemplary embodiments, the processor may output a mode modification signal when the processor processes the contact data and a contactless mode signal is received or when the processor processes the contactless data and a contact mode signal is received.

In even other exemplary embodiments, the micro-computer may further include a reset controller that generates a reset signal, which resets the processor, in response to the mode modification signal.

In yet other exemplary embodiments, the micro-computer may, when the contact data is received from the contact-type interface while the micro-computer is processing the contactless data and when the contactless data is received from the contactless-type interface while the micro-computer is processing the contact data, output a power select signal for selecting the contact type power voltage or the contactless type power voltage according to the priority information.

In further exemplary embodiments, the power controller may include: a power detector that receives the contact type power voltage from the contact-type interface and the contactless type power voltage from the contactless-type interface, outputs a power detection signal to the micro-computer, and outputs a switching signal in response to the power select signal; and a power voltage selector that provides the contact type power voltage or the contactless type power voltage to the micro-computer.

In still other exemplary embodiments, methods for operating a chip card include: receiving one of contact-type data or contactless-type data as first received data; operating the chip card in an operating mode based on a type of the first received data, the operating mode comprising a contact mode when the type of the first received data is contact-type data and a contactless mode when the type of the first received data is contactless-type data; receiving one of the contact-type data or the contactless-type data that is not the first received data as second received data; determining priorities of the contact-type data and the contactless-type data when the second received data is received; and ignoring the second received data when it is determined that a priority of the type of the first received data is higher than a priority of the type of the second received data, and continuing to operate the chip card in the operating mode.

In some exemplary embodiments, the methods may further include operating the chip card in a second operating mode corresponding to the type of the second received data when it is determined that the priority of the type of the first received data is lower than the priority of the type of the second received data.

In other exemplary embodiments, the operating may include initializing the chip card and processing the received data, and the methods may further include: initializing the chip card according to the second received data when the priority of the first received data is lower than the priority of the second received data; and processing the second received data.

In even other exemplary embodiments, methods for operating a chip card include: receiving contact-type data from a contact-type terminal; initializing the chip card to operate in a contact mode for processing the contact-type data; receiving contactless-type data from a contactless-type terminal, and checking priorities of the contact-type data and the contactless-type data when the contactless-type data is received; and ignoring the contactless-type data when a priority of the contact-type data is higher than a priority of the contactless-type data, and continuing to operate in the contact mode.

In some exemplary embodiments, the methods may further include: initializing the chip card to operate in a contactless mode for processing the contactless-type data and processing the contactless-type data in the contactless mode when the priority of the contact-type data is lower than the priority of the contactless-type data.

In other exemplary embodiments, the processing of the contactless-type data may include switching from operating the chip card with contact-type power to operating the chip card with contactless-type power.

In still other exemplary embodiments, the initializing comprises performing a warm-reset of the chip card.

In yet other exemplary embodiments, methods for operating a chip card include: receiving contactless-type data from a contactless-type terminal; initializing the chip card to operate in a contactless mode for processing the contactless-type data; receiving contact-type data from a contact-type terminal, and checking priorities of the contactless-type data and the contact-type data when the contact-type data is received; initializing the chip card to operate in a contact mode for processing the contact-type data when a priority of the contactless-type data is lower than a priority of the contact-type data; and processing the contact-type data in the contact mode.

BRIEF DESCRIPTION OF THE DRAWINGS

The accompanying drawings are included to provide a further understanding of the exemplary embodiments, and are incorporated in and constitute a part of this specification. The drawings illustrate exemplary embodiments and, together with the description, serve to explain principles of the disclosure. In the drawings.

DETAILED DESCRIPTION OF EXEMPLARY EMBODIMENTS

Exemplary embodiments will be described below in more detail with reference to the accompanying drawings. The exemplary embodiments may, however, be embodied in different forms, and the disclosure should not be construed as limited to the exemplary embodiments set forth herein. Rather, these exemplary embodiments are provided so that this disclosure will be thorough and complete, and will fully convey the scope of the inventive concept to those skilled in the art.

Integrated Circuit (IC) cards can be classified into contact cards, contactless cards, hybrid-cards, and combi-cards according to the operation method of the IC card. The combi-cards communicate with a terminal in contact and contactless modes. The combi-cards, as well-known, include eight contact points (or terminals), and include internal or external contact point(s) for contacting an antenna. When operating in a contact mode, the combi-cards receive a power voltage, a ground voltage, a clock signal, and a reset signal through the contact points to communicate with a terminal. On the other hand, when operating in a contactless mode, the combi-cards extract a power voltage, a ground voltage, a clock signal, a reset signal, and data from wireless frequency signals received via an antenna to communicate with a terminal. When a power voltage is supplied in a contact mode during the contactless mode, the combi-cards are stopped from operating or are switched into the contact mode, and ignore wireless frequency signals received during the contact mode.

Such combi-cards may be used as Subscriber Identity Module (SIM) cards that are being used in mobile communication networks and mobile communication terminals. Recently, Universal Subscriber Identity Module (USIM) cards embodying various functions, such as user authentication, global roaming, and electronic commerce, in one card are being widely supplied as a combination type of a SIM card and Universal IC card (UICC). The USIM card includes a small-sized CPU and a memory. The CPU identifies a user through coding and decoding functions, and the memory is used as a storage space for additional services. The memory includes various functions, such as credit cards, traffic cards, and membership cards, and is wirelessly provided with services by an Over The Air (OTA) technology that can provide services using only banking or card service approval without a help of a separate chip. Recently, the USIM cards are being applied to various fields, such as student's ID cards, company access cards, membership cards, and apartment access cards.

On the other hand, since smart cards, being a same size as credit cards, equipped with an integrated circuit have the functions of large-capacity memory, two-way communication, and information protection, the smart cards are being used in various fields, such as identification cards, credit cards, cash cards, traffic cards, medical insurance cards, and employee's ID cards.

Thus, the IC cards of the combi-type may transmit RF signals to contactless-type terminals, and transmit contact-type signals to contact-type terminals. If a contactless-type terminal is disposed adjacent to a contact-type terminal, and an IC card is operable with both contactless-type and contact-type terminals, the IC card may cease to function.

Figure 1:
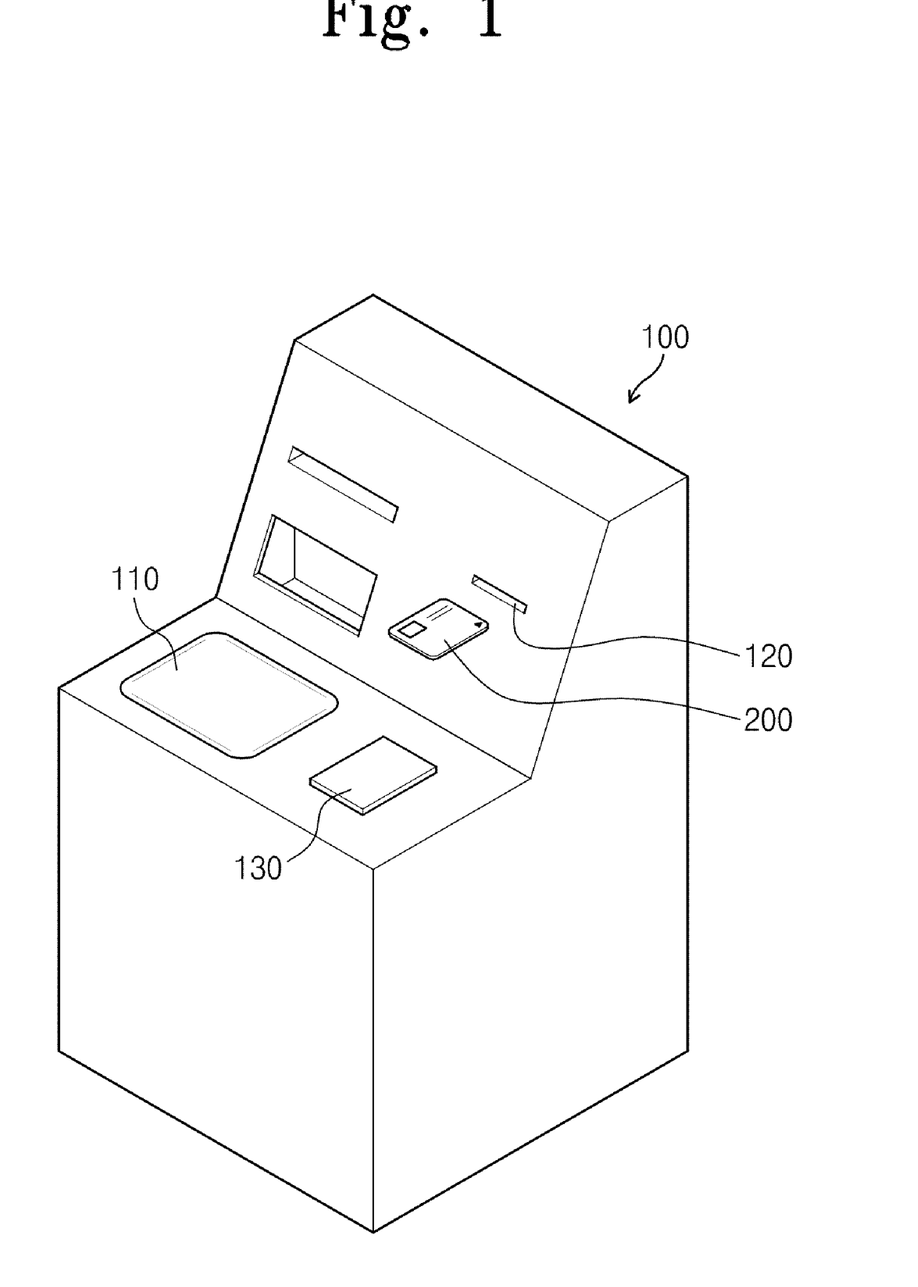
FIG. 1 is a diagram illustrating a bank's automated teller machine that communicates with a chip card in contact and contactless modes.

FIG. 1 is a diagram illustrating a bank's Automated Teller Machine (ATM) that communicates with a chip card in contact and contactless modes.

Referring to FIG. 1, the ATM 100 is a computerized telecommunications device that is designed to provide the clients of a financial institution with access to financial transactions in a public space without the need for a cashier, human clerk, or bank teller. At the ATM 100, the customer is identified by inserting an ATM card such as a cash card, a debit card, credit card with a magnetic stripe, or a smartcard with an IC chip, into the ATM 100. The ATM card may contain a unique card number and some security information, such as an expiration date. In addition to the primary function, modern ATMs 100 may perform various additional functions, such as accepting reservations for trains, buses, and movies, recharging traffic cards, exchanging coins, and accepting insurance premium payments.

In order to perform various functions, the ATM 100 may include a display unit 110 for displaying information to users, a card insertion slot 120, into which a chip card 200 is inserted, and a wireless terminal 130 for performing an RF communication with the chip card 200. The display unit 110 may not only display information, but may also serve as a touch pad to receive information, such as passwords, from users.

The chip card 200 may be a plastic smart card with a magnetic stripe. The chip card 200 may include one of Universal IC Cards (UICCs), Subscriber Identity Module (SIM) cards, and Universal Subscriber Identity Module (USIM) cards. The chip card 200 may be a combi-type card that is operable in contact and contactless modes. If the chip card 200 is inserted into the card insertion slot 120, the ATM 100 may exchange data with the chip card 200 in the contact mode. If the chip card 200 is disposed adjacent to the wireless terminal 130, the ATM 100 may communicate with the chip card 200 through the wireless terminal 130.

The chip card 200 may not only communicate with the ATM 100, but may also communicate with various terminals, such as credit card payment machines, Point of Sale (POS) terminals, door locks, access terminals, public phones, highway toll payment systems, train fare payment systems, medical information recorders, and electronic civil affairs automatic dispensers. The communication distance of the chip card 200, complying with ISO14443 standards, may be about 10 cm. In different standards, for example, ISO/IEC 18000 dms, the communication distance may reach about 1 m. When a user intends to insert the chip card 200 into the card insertion slot 120, the chip card 200 may pass over the wireless terminal 130. In this case, an undesired contactless-type data transmission between the chip card 200 and the wireless terminal 130 may occur. If the chip card 200 is initialized due to the undesired contactless-type data transmission between the chip card 200 and the wireless terminal 130, the chip card 200 may not perform a contact-type communication with the ATM 100 even though the chip card 200 is inserted into the card insertion slot 120.

As another example, although a user intends to perform a contactless-type data transmission between the chip card 200 and the wireless terminal 130, the user may accidentally insert the chip card 200 into the card insertion slot 120. In this case, even though a distance between the chip card 200 inserted into the card insertion slot 120 and the wireless terminal 130 is sufficient for contactless-type communication, the chip card 200 may perform the contact-type communication with the ATM 100.

Therefore, an exemplary embodiment provides a chip card 200 of a combi-type that can operate in contact and contactless modes, and change the operation mode according to priority of the contact and contactless data transmission.

Figure 2:
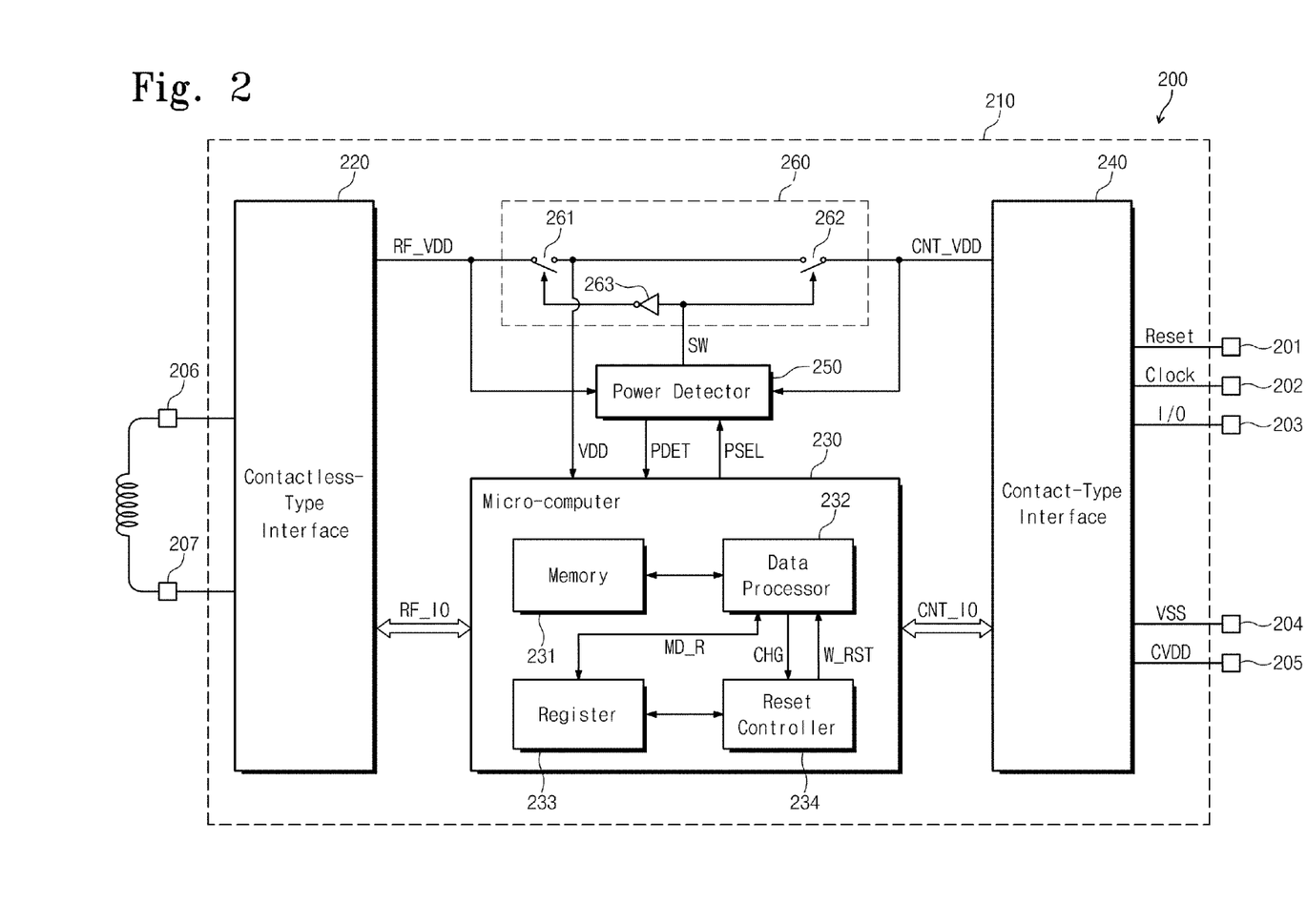
FIG. 2 is a diagram illustrating a configuration of a chip card according to an exemplary embodiment.

FIG. 2 is a diagram illustrating a configuration of a chip card 200 according to an exemplary embodiment.

Referring to FIG. 2, the chip card 200 may be a combi-type IC card including a plurality of contacts 201 to 205 and two antenna terminals 206 and 207. The contacts 201 to 205 and the two antenna terminals 206 and 207 are connected to an integrated chip 210.

The IC chip 210 may include a micro-computer 230 and a contact-type interface 240 connected to the contacts 201 to 205 and the micro-computer 230. The contact-type interface 240 may receive signals from the contacts 201 to 203, and deliver contact-type data CNT_IO to the micro-computer 230. For example, the signals inputted from the contacts 201 to 203 to the contact-type interface 240 may include a reset signal, a clock signal, and a data signal. The contact-type interface 240 may receive a ground voltage VSS and a power voltage CVDD from the contacts 204 and 205, and output a contact-type power voltage CNT_VDD.

The IC chip 210 may further include a contactless-type interface 220. The contactless-type interface 220 may be connected between the antenna terminals 206 and 207 and the micro-computer 230. The contactless-type interface 220 may receive an Radio Frequency (RF) signal through an antenna connected to the antenna terminals 206 and 207, and may generate contactless-type data RF_IO and a contactless-type power voltage RF_VDD. Here, the RF means contactless-type signals. However, the contactless-signals may include various frequency components received by the antenna terminals 206 and 207.

The IC chip 210 may include a power controller (not shown) that may receive the contact-type power voltage CNT_VDD from the contact-type interface 240 and the contactless-type power voltage RF_VDD from the contactless-type interface 220, and provide one of the two power voltages CNT_VDD and RF_VDD to the micro-computer 230 as a power voltage VDD. The power controller may include a power detector 250 and a power voltage selector 260. The power detector 250 may receive the contact-type power voltage CNT_VDD from the contact-type interface 240 and the contactless-type power voltage RF_VDD from the contactless-type interface 220 and output a power detection signal PDET to the micro-computer 230. The power voltage selector 260 may select one of the contact-type power voltage CNT_VDD and the contactless-type power voltage RF_VDD as the power voltage VDD, and provide the power voltage VDD to the micro-computer 230, in response to a switching signal SW from the power detector 250.

If one of the contact-type power voltage CNT_VDD from the contact-type interface 240 and the contactless-type power voltage RF_VDD from the contactless-type interface 220 is inputted, the power detector 250 may output a power detection signal PDET corresponding to the inputted power voltage. The power detector 250 may output a switching signal SW to select and receive one of the contact-type power voltage CNT_VDD and the contactless-type power voltage RF_VDD as a power voltage VDD.

The power voltage selector 260 may include switches 261 and 262, and an inverter 263. The switch 262 may be connected between the contact-type interface 240 and the micro-computer 230, and may be turned on in response to the switching signal SW from the power detector 250. The switch 261 may be connected between the contactless-type interface 220 and the micro-computer 230, and may be turned on in response to a reverse switching signal SW outputted from the inverter 263. For example, if the switching signal SW outputted from the power detector 250 is a high level, the contact-type power voltage CNT_VDD from the contact-type interface 240 may be provided to the micro-computer 230 as a power voltage VDD. On the other hand, if the switching signal SW outputted from the power detector 250 is a low level, the contactless-type power voltage RF_VDD from the contactless-type interface 220 may be provided to the micro-computer 230 as a power voltage VDD. Although not shown, the power detector 250 may provide a power voltage to the switches 261 and 262 and the inverter 263 if one of the contact-type power voltage CNT_VDD and the contactless-type power voltage RF_VDD is supplied.

The power detector 250 may output a switching signal SW according to an inputted power voltage if one of the contact-type power voltage CNT_VDD and the contactless-type power voltage RF_VDD is supplied. However, if the power selector 250 receives a power select signal PSEL from the micro-computer 230 for one of the contact-type power voltage CNT_VDD and the contactless-type power voltage RF_VDD, the power detector 250 may output a corresponding switching signal SW in response to the power select signal PSEL.

The micro-computer 230 may include a memory 231, a data processor 232, a register 233, and a reset controller 234. The memory 231 may be a read only memory (ROM), random access memory (RAM), flash memory. The memory 231 may be connected to the data processor 232 and may store a series of commands to be executed by the data processor 232. The register 233 may be connected to the data processor 232, and may store priority information of the contact-type and contactless modes. The priority information stored in the register 233 may be modified by an external terminal through one of the contact-type interface 240 and the contactless-type interface 220. The reset controller 234 may output a signal W_RST to reset the data processor 232 in response to a mode modification signal of the data processor 232. The data processor 232 may execute a series of commands to perform operations of the flowcharts shown in FIGS. 3 and 4.

Hereinafter, operations of a chip card 200 according to an exemplary embodiment will be described in detain with reference to FIGS. 3 and 4.

First, it will be assumed that information (e.g., logic '0'), indicating a contactless mode has a higher priority than a contact mode, is stored in a register 233 of a micro-computer 230.

Figure 3:
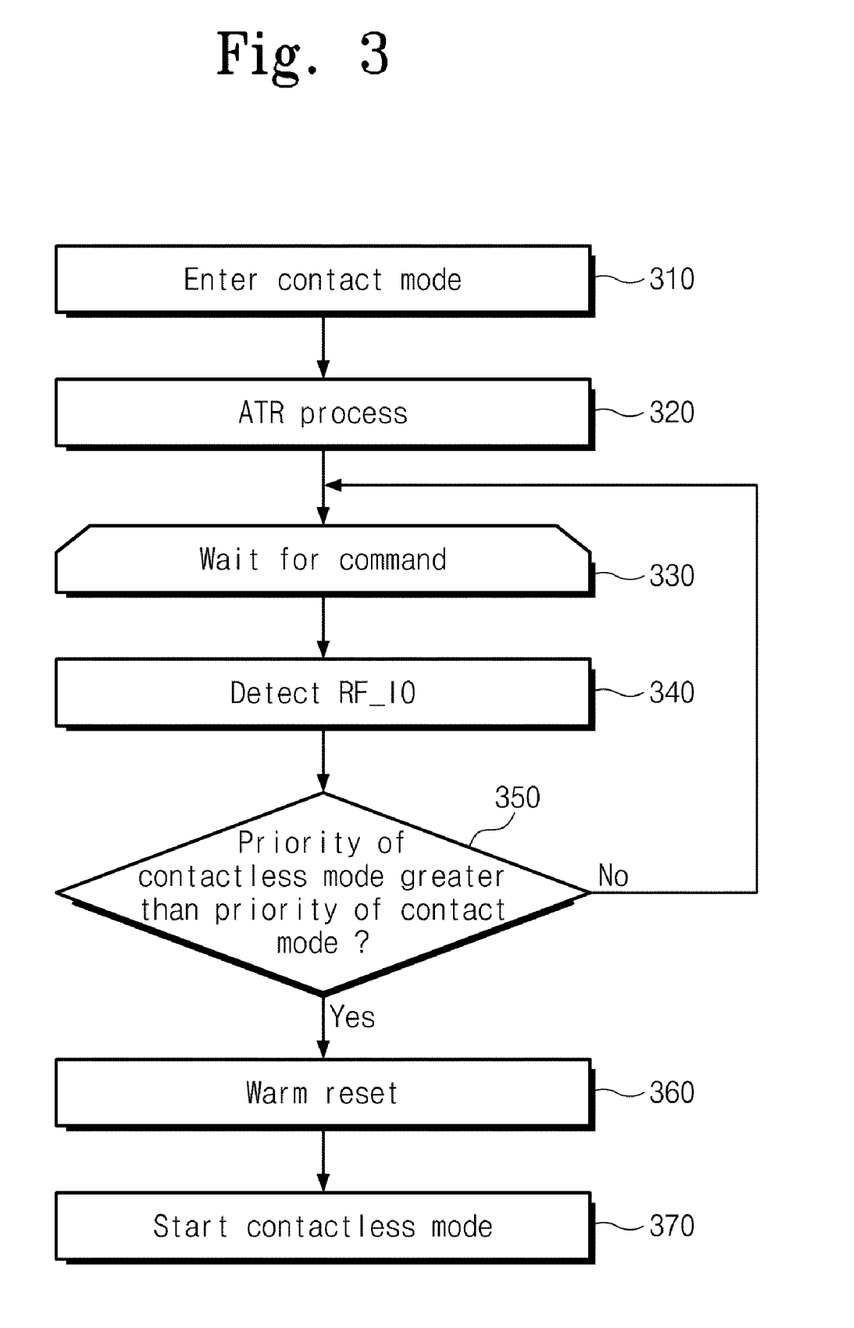
FIG. 3 is a flowchart illustrating an operation of a data processor according to an exemplary embodiment.

FIG. 3 is a flowchart illustrating an operation of a data processor of a chip card according to an exemplary embodiment when contactless-type data is received from a contactless-type terminal through an antenna terminal after an IC chip is connected to a contact-type terminal through contacts.

If a chip card 200 contacts a contact-type terminal, such as the card insertion slot 120 of the ATM 100 shown in FIG. 1, the contact-type terminal may input contact-type signals into contacts 201 to 203, and may supply contact 204 and contact 205 with a ground voltage VSS and a contact-type power voltage CNT_VDD, respectively.

A power detector 250 that receives the contact-type power voltage CNT_VDD may output a first level of a power detection signal PDET. When the level of the power detection signal PDET is the first level, a micro-computer 230 may recognize that the contact-type power voltage CNT_VDD has been supplied, and the micro-computer 230 may output a power select signal PSEL at a high level. The power selector 250 may output a switching signal SW of a high level in response to receiving the power select signal PSEL of a high level. Therefore, a switch 261 may be turned off, and a switch 262 may be turned on. Accordingly, the contact-type power voltage CNT_VDD may be supplied to the micro-computer 230.

In operation S310, a data processor 232 supplied with a power voltage VDD and having received a contact-type data CNT_IO from a contact-type interface 240 may enter a contact mode. The contact-type data CNT_IO from the contact-type interface 240 may include a clock signal and a reset signal. In operation S320, the data processor 232 may perform an Answer To Reset (ATR) process in response to the reset signal. The ART process may include a series of initializing processes used to determine parameters for data transmission/reception between the chip card 200 and the contact-type terminal. If the initializing processes are completed, the data processor 232 may wait for a command from the contact-type terminal. For example, if the contact-type terminal is an ATM 100, a request command for personal information such as an account number may be received from the ATM 100.

In operation S340, if contactless-type data RF_IO is received from a contactless-type interface 220 while the data processor 232 is performing the ATR process or waiting for a command from the contact-type terminal, the data processor 232 may check a value MD_R of a register 233 storing priority information of the contact and contactless modes in operation S350. If the value MD_R is a value indicating that the contactless mode has a higher priority than the contact mode (e.g., logic '0') (S350—Yes), the data processor 232 may output a mode modification signal CHG. A reset controller 234 may output a reset signal W_RST to reset the data processor 232 in response to the mode modification signal CHG.

In operation S360, the data processor 232 may perform a warm-reset in response to the reset signal W_RST. While the data processor 232 is performing the warm-reset in response to the reset signal W_RST, a clock signal and a contact-type power voltage CNT_VDD are continuously inputted through the contact-type interface 240.

Thereafter, the data processor 232 may operate in a contactless mode in operation S370. That is, the data processor 232 may receive the contactless-type data RF_IO from the contactless-type interface 220, and may ignore the contact-type data CNT_IO from the contact-type interface 240. Therefore, the IC chip 210 may perform an RF communication with the contactless-type terminal through the antenna terminals 206 and 207. On the other hand, the micro-computer 230 may output a power select signal PSEL of a low level to receive the contactless-type power voltage RF_VDD from the contactless-type interface 220. The power detector 250 may output a switching signal SW of a low level in response to the power select signal PSEL of the low level.

If, in operation S350 checking the value of the register 233, the value indicates that the contact mode has a higher priority than the contactless mode (e.g., logic '1') (S350—No), the contactless-type data RF_IO received from the contactless-type interface 220 may be ignored. In this case, the IC chip 210 may remain in contact mode and continue to exchange data with the contact-type terminal through the contacts 201 to 205.

Figure 4:
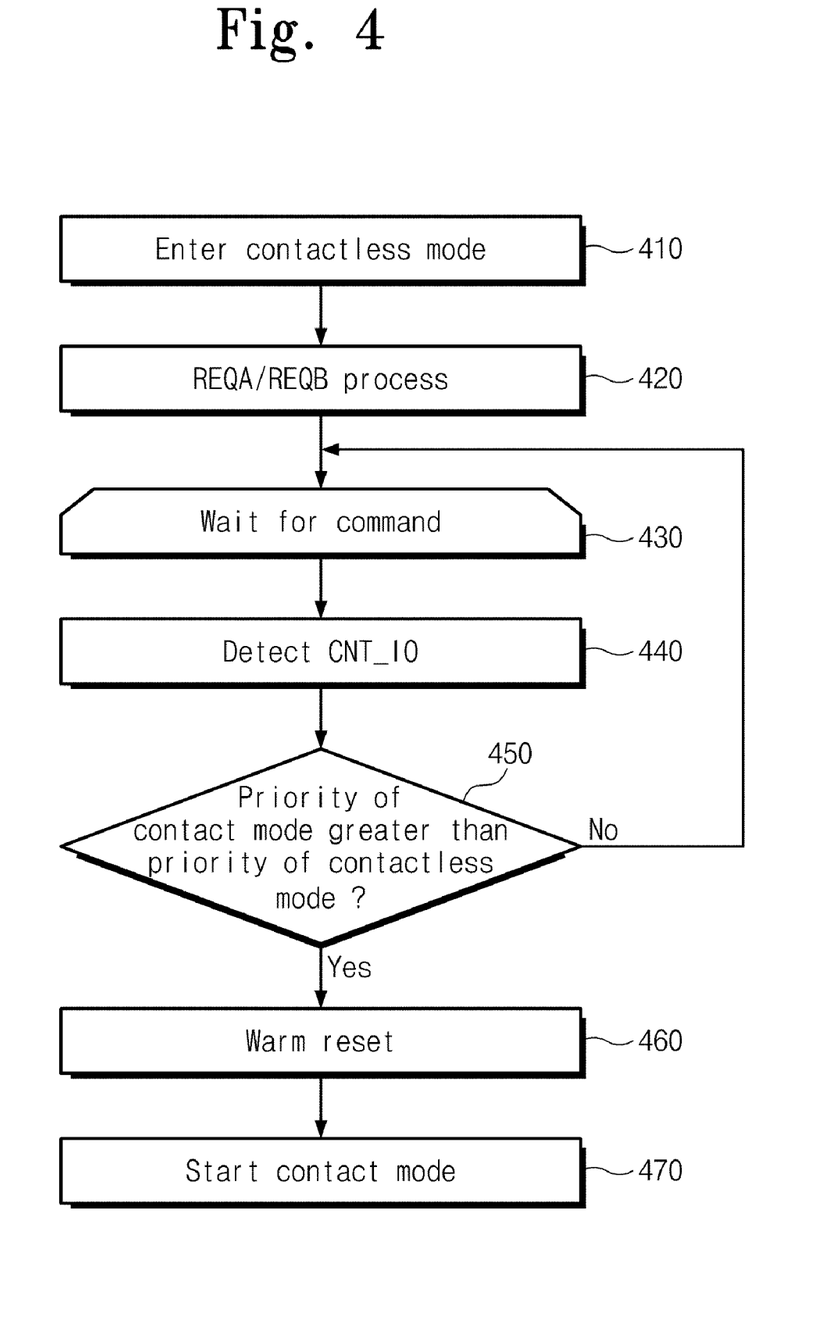
FIG. 4 is a flowchart illustrating an operation of a data processor according to an exemplary embodiment.

FIG. 4 is a flowchart illustrating an operation of a data processor of a chip card according to an exemplary embodiment when contact-type data is received from a contact-type terminal through contacts while an IC chip performs an RF communication with a contactless-type terminal through an antenna terminal.

Referring to FIG. 4, if a chip card 200 is positioned adjacent to the contactless-type terminal 130 of the ATM shown in FIG. 1, RF signal transmission is performed between the chip card 200 and the contactless-type terminal 130. A contactless-type interface 220 may output a contactless-type power voltage RF_VDD in response to an RF signal received through antenna terminals 206 and 207. A power detector 250 receiving the contactless-type power voltage RF_VDD may output a power detection signal PDET of a second level. A micro-computer 230 may output a power select signal PSEL of a low level in response to the power detection signal PDET of the second level. The power detector 250 may output a switching signal SW of a lower level in response to the power select signal PSEL of the low level. Therefore, a switch 261 may be turned on, and a switch 262 may be turned off. The microcomputer 230 may be supplied with the contactless-type power voltage RF_VDD from the contactless-type interface 220.

In operation 410, a data processor 232 supplied with a power voltage VDD and having received a contactless-type data RF_IO from a contactless-type interface 220 may enter a contactless mode. The contactless-type data RF_IO from the contactless-type interface 220 may include a clock signal and a reset signal. In operation S420, the data processor 232 may perform an initializing process complying with a communication interface in response to the reset signal. For example, if the IC card 200 is a 100% ASK modified-type card, i.e., an A-type card, the data processor 232 may perform a REQA process. If the IC card 200 is a B-type card complying with a 10%ASK modified-type, the data processor 232 may perform a REQB process.

If the initializing process is completed, the data processor 232 may wait for a command from the contactless-type terminal in operation S430. In operation S440, if contact-type data CNT_IO is received from a contact-type interface 240 while the data processor 232 is performing the initializing process or waiting for a command from the contactless-type terminal, the data processor 232 may check a value MD_R of a register 233 storing priority information of the contact-type and contactless modes in operation S450. If the value MD_R is a value indicating that the contact mode has a higher priority than the contactless mode (e.g., logic '1') (S450—Yes), the data processor 232 may activate a mode modification signal CHG. A reset controller 234 may output a reset signal W_RST to reset the data processor 232 in response to the mode modification signal CHG.

In operation 460, the data processor 232 may perform a warm-reset in response to the reset signal W_RST. Thereafter, the data processor 232 may operate in a contact mode in operation 470. That is, the data processor 232 may receive the contact-type data CNT_IO from the contact-type interface 240, and may ignore the contactless-type data RF_IO from the contactless-type interface 220. Therefore, the IC chip 210 may perform a communication with the contact-type terminal through contacts 201 to 205. On the other hand, the microcomputer 230 may modify a power select signal PSEL into a high level to receive the contact-type power voltage CNT_VDD from the contact-type interface 240.

Thus, although a user inserts the IC card 200 into the card insertion slot 120 while communicating through the contactless-type terminal 130, the IC card 200 may be changed from the contactless mode to the contact-type mode, thereby performing a stable operation.

If, in operation S450 checking the value of the register 233, the value indicates that the contactless mode has a higher priority than the contact mode (e.g., logic '0') (S450—No), the contact-type data CNT_IO received from the contact-type interface 240 may be ignored. In this case, the IC chip 210 may remain in contactless mode and continue to exchange data with the contactless-type terminal through the antenna terminals 206 and 207.

Figure 5:
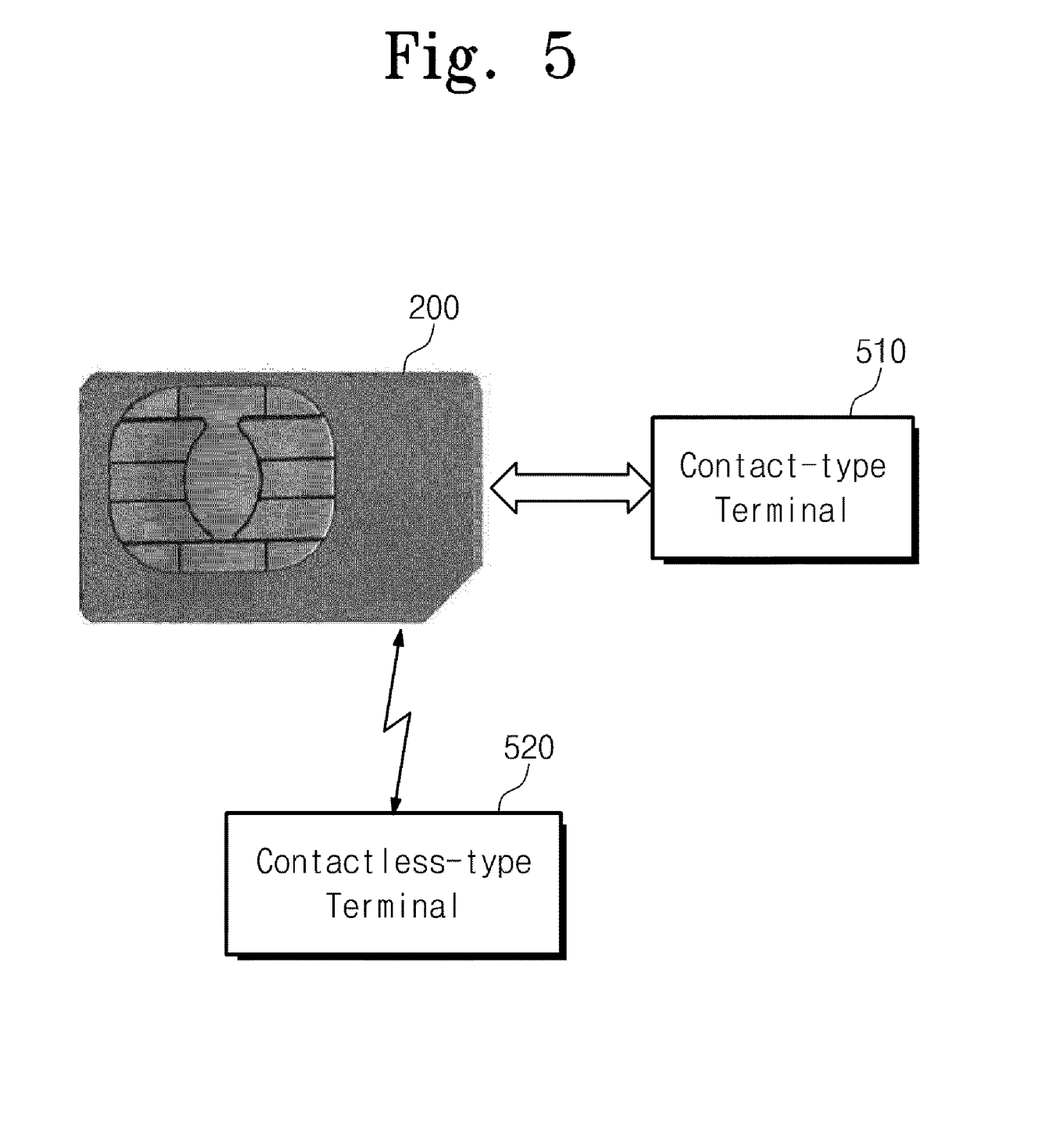
FIG. 5 is a diagram illustrating terminals communicating with a chip card according to an exemplary embodiment.

FIG. 5 is a diagram illustrating terminals communicating with a chip card according to an exemplary embodiment.

Referring to FIG. 5, a chip card 200 that can operate in contact and contactless modes may be connected to a contact-type terminal 510 in the contact mode, and may be connected to a contactless-type terminal 520 in the contactless mode.

Figure 6:
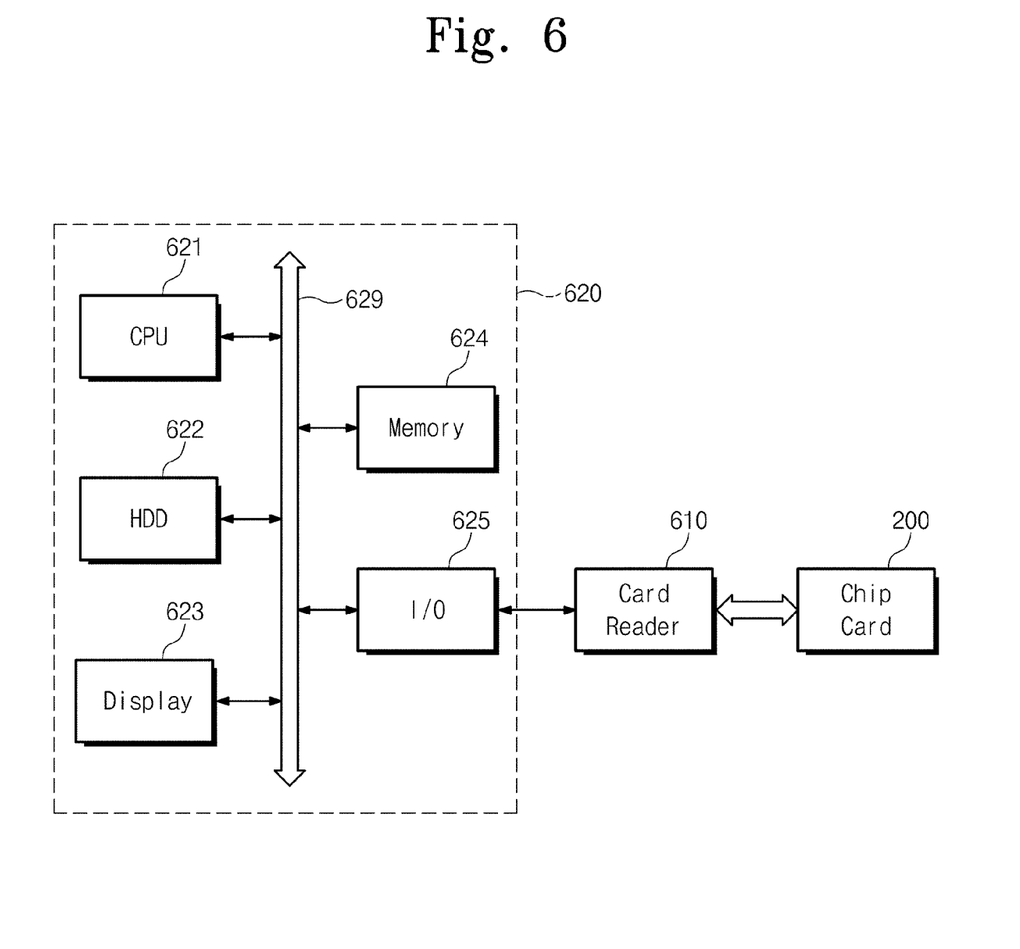
FIG. 6 is a diagram illustrating a computer system communicating with a chip card according to an exemplary embodiment.

FIG. 6 is a diagram illustrating a computer system communicating with a chip card according to an exemplary embodiment.

Referring to FIG. 6, a computer system 620 may include a central processing unit (CPU) 621 connected to a bus 629, a hard disk drive (HDD) 622, a display 623, a memory 624, and an input/output interface 625. In addition to the components shown in FIG. 6, the computer system 620 may further include a user interface (not shown), such as a keyboard and a mouse and a graphic card. A card reader 610 connected to a chip card 200 in contact or contactless modes may be connected to the input/output interface 625 of the computer system 620. The card reader 610 and the input/output interface 625 may be connected to one of a Universal Serial Bus (USB), IEEE1394, and various serial communication interfaces and parallel communication interfaces.

Figure 7:
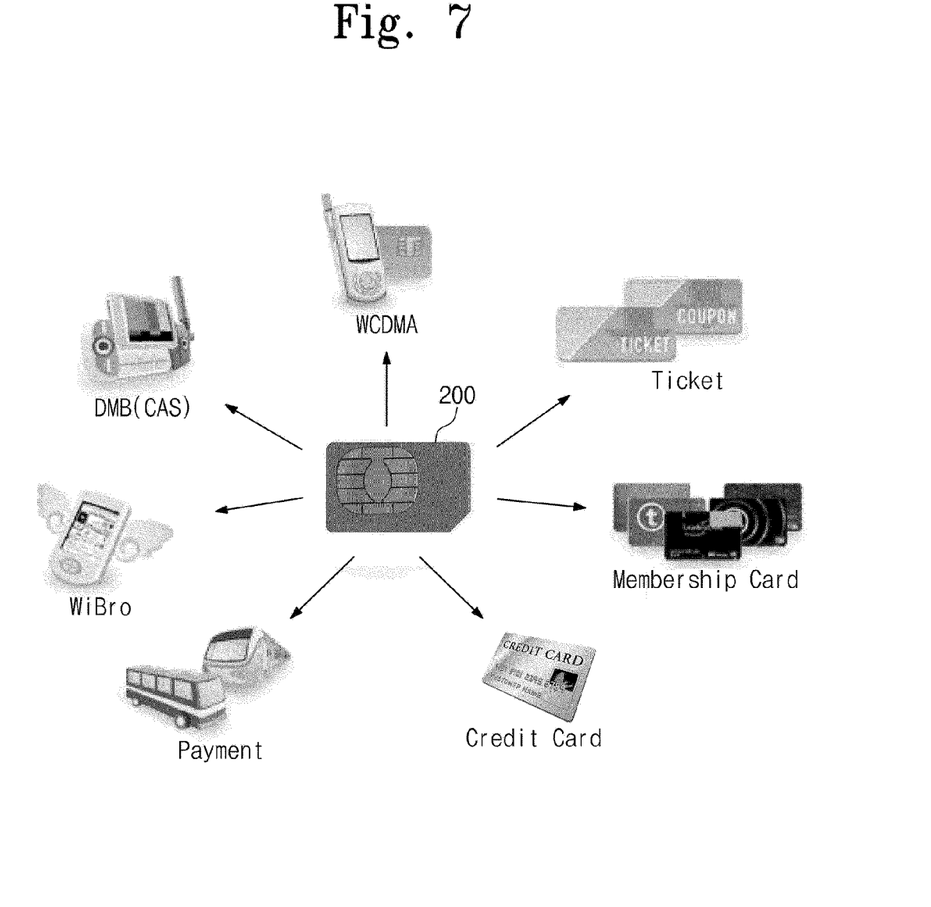
FIG. 7 is a diagram illustrating fields to which a chip card may be applied according to an exemplary embodiment.

FIG. 7 is a diagram illustrating fields to which a chip card may be applied according to an exemplary embodiment.

Referring to FIG. 7, a chip card 200 may be mounted into a WCDMA mobile phone to provide subscriber identity information. The chip card 200 may be used as a ticket issued by a ticket issuing system. The chip card 200 may be connected to an ATM and a credit card terminal as a credit card. The chip card 200 may be used as a traffic fare payment means for a bus, a taxi, a subway, an airplane, and a ship. The chip card 200 may provide a PISIM function necessary for authentication of mobile WiMAX or Wireless Broadband Internet (WiBro). The chip card 200 may be used in digital right management and conditional access systems of mobile multimedia broadcasting service, such as satellite Digital Multimedia Broadcasting (DMB) and terrestrial DMB.

In such various application fields, the chip card 200 can exchange signals with a terminal (or a host) in contact and contactless modes. If a new signal of a different mode is received during an initializing operation of one of contact and contactless modes, an operation mode can be modified according to predetermined priority information.

According to the above exemplary embodiments, an IC card can be switched into a different mode when a signal of the different mode is received during an initialization into or during operation of either a contact-type mode or a contactless-type mode. Therefore, a stable operation of the IC card can be ensured, and user's convenience can be enhanced.

A method of switching the IC card into various modes may be embodied as computer readable code recorded on a computer readable recording medium for causing a computer or processor to implement the method when executing the computer readable code. The computer readable medium may be any recording medium capable of storing data that is read and/or executed by a computer system or processor, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network. Alternatively, the method of switching the IC card may be embodied as computer readable code transmitted over a transmission medium, such as carrier waves, for transmission over a network, such as the Internet.

The above-disclosed subject matter is to be considered illustrative and not restrictive, and the appended claims are intended to cover all such modifications, enhancements, and other embodiments, which fall within the true spirit and scope of the inventive concept. The term "connected" is not limited to a logical connection, electrical connection, or physical connection, and may include one or more of the above types of connection and/or other connections apparent to the skilled artisan. Expressions such as "at least one of," when preceding a list of elements, modify the entire list of elements and do not modify the individual elements of the list. Thus, the scope of the inventive concept is to be determined by the broadest permissible interpretation of the following claims and their equivalents, and shall not be restricted or limited by the foregoing detailed description.

What is claimed is:

1. A chip card comprising:
   a processor that controls the chip card to operate in a contact mode in which contact-type data is received by a contact interface of the chip card or a contactless mode in which contactless-type data is received by a contactless interface of the chip card, controls the chip card, when the chip card is receiving the contact-type data by the contact interface in the contact mode, to switch from receiving the contact-type data by the contact interface in the contact mode to receiving the contactless-type data by the contactless interface in the contactless mode in response to receiving the contactless-type data by the contactless interface, and controls the chip card, when the chip card is receiving the contactless-type data by the contactless interface in the contactless mode, to switch from receiving the contactless-type data by the contactless interface in the contactless mode to receiving the contact-type data by the contact interface in the contact mode in response to receiving the contact-type data by the contact interface.

2. The chip card of claim 1, wherein the processor outputs a mode modification signal when the processor controls the chip card to receive the contact-type data by the contact interface in the contact mode and a contactless mode signal having the contactless-type data is received by the contactless interface or when the processor controls the chip card to receive the contactless-type data by the contactless interface in the contactless mode and a contact mode signal having the contact-type data is received by the contact interface.

3. The chip card of claim 1, wherein the chip card comprises one of a Universal IC Card (UICC), Subscriber Identity Module (SIM) card, and a Universal Subscriber Identity Module (USIM) card.

4. A chip card comprising:
   a processor that controls the chip card to operate in a contact mode or a contactless mode, controls the chip card, when the chip card is operating in the contact mode, to switch from operating in the contact mode to operating in the contactless mode, and controls the chip card, when the chip card is operating in the contactless mode, to switch from operating in the contactless mode to operating in the contact mode; and
   a register that stores priority information, the priority information indicating a priority of the contact mode and a priority of the contactless mode,
   wherein the processor controls the chip card to be supplied with power in the contactless mode if the priority information indicates the priority of the contactless mode is higher than the priority of the contact mode when the chip card is operating in the contact mode and a contactless mode signal is received by the chip card and controls the chip card to be supplied with power in the contact mode if the priority information indicates the priority of the contact mode is higher than the priority of the contactless mode when the chip card is operating in the contactless mode and a contact mode signal is received by the chip card.

5. A chip card comprising:
   at least one contact pad;
   a micro-computer that processes contact data or contactless data, the micro-computer including a register that stores priority information on the contact data and the contactless data;
   a contact-type interface that transmits contact data between the at least one contact pad and the micro-computer; and
   a contactless-type interface that transmits contactless data between at least one antenna and the micro-computer;
   wherein the micro-computer, when the contact data is received from the contact-type interface while the micro-computer is processing the contactless data, switches from processing the contactless data to processing the contact data according to the priority information stored in the register, and, when the contactless data is received from the contactless-type interface while the micro-computer is processing the contact data, switches from processing the contact data to processing the contactless data according to the priority information stored in the register.

6. The chip card of claim 5, further comprising a power controller that provides a contact type power voltage received from the contact-type interface or a contactless type power voltage received from the contactless-type interface to the micro-computer.

7. The chip card of claim 6, wherein the micro-computer, when the contact data is received from the contact-type interface while the micro-computer is processing the contactless data and the priority information indicates a priority of the contact mode is higher than a priority of the contactless mode, outputs a power select signal for selecting the contact type power voltage according to the priority information, and when the contactless data is received from the contactless-type interface while the micro-computer is processing the contact data and the priority information indicates the priority of the contactless mode is higher than the priority of the contact mode, outputs a power select signal for selecting the contactless type power voltage.

8. The chip card of claim 7, wherein the power controller comprises:
   a power detector that receives the contact type power voltage from the contact-type interface and the contactless type power voltage from the contactless-type interface, outputs a power detection signal to the micro-computer, and outputs a switching signal in response to the power select signal; and
   a power voltage selector that provides the contact type power voltage or the contactless type power voltage to the micro-computer.

9. The chip card of claim 8, wherein the power voltage selector comprises:
   an inverter that inverts the switching signal;
   a first switch, disposed between the contactless-type the contactless-type interface and the micro-computer, controlled by the inverted switching signal to provide the contactless type power voltage to the micro-computer; and
   a second switch, disposed between the contact-type interface and the micro-computer, controlled by the switching signal to provide the contact type power voltage to the micro-computer.

10. The chip card of claim 9, wherein the power detector generates the switching signal according to a detected voltage among the contact type power voltage and the contactless type power voltage when the contact-type power voltage is initially received from the contact-type interface or the contactless-type power voltage is initially received from the contactless-type interface.

11. The chip card of claim 5, wherein the micro-computer includes a processor that processes the contact data and the contactless data.

12. The chip card of claim 11, wherein the processor outputs a mode modification signal when the processor processes the contact data and a contactless mode signal is received or when the processor processes the contactless data and a contact mode signal is received.

13. The chip card of claim 12, wherein the micro-computer further includes a reset controller that generates a reset signal, which resets the processor, in response to the mode modification signal.

14. The chip card of claim 5, wherein the chip card comprises one of a Universal IC Card (UICC), Subscriber Identity Module (SIM) card, and a Universal Subscriber Identity Module (USIM) card.

15. A method for operating a chip card, the method comprising:
receiving one of contact-type data or contactless-type data as first received data;
operating the chip card in an operating mode based on a type of the first received data, the operating mode comprising a contact mode when the type of the first received data is contact-type data and a contactless mode when the type of the first received data is contactless-type data;
receiving one of the contact-type data or the contactless-type data that is not the first received data as second received data;
determining whether a priority of the contact-type data is higher than a priority of the contactless-type data when the second received data is received; and
ignoring the second received data when the operating mode is the contact mode, the second received data is the contactless-type data, and it is determined that the priority of the contact-type data is higher than the priority of the contactless-type data and continuing to operate the chip card in the contact mode, and ignoring the second received data when the operating mode is the contactless mode, the second received data is the contact-type data, and it is determined that the priority of the contactless-type data is higher than the priority of the contact-type data and continuing to operate the chip card in the contactless mode.

16. The method of claim 15, further comprising operating the chip card in the contact mode when the operating mode is the contactless mode, the type of the second received data is the contact-type data, and it is determined that the priority of the contactless-type data is lower than the priority of the contact-type data, and operating the chip in the contactless mode when the operating mode is the contact mode, the type of the second received data is the contactless-type data, and it is determined that the priority of the contact-type data is lower than the priority of the contactless-type data.

17. The method of claim 15, wherein the operating comprises initializing the chip card and processing the received data, and wherein the method further comprises:
initializing the chip card according to the second received data when the priority of the first received data is lower than the priority of the second received data; and
processing the second received data.

18. A method for operating a chip card, the method comprising:
receiving contact-type data from a contact-type terminal;
initializing the chip card to operate in a contact mode for processing the contact-type data;
receiving contactless-type data from a contactless-type terminal, and comparing a priority of the contact-type data and a priority of the contactless-type data when the contactless-type data is received; and
ignoring the contactless-type data when the priority of the contact-type data is higher than the priority of the contactless-type data and continuing to operate in the contact mode, and switching from operating the chip card with contact-type power to operating the chip card with contactless-type power when the priority of the contact-type data is lower than the priority of the contactless-type data.

19. The method of claim 18, further comprising:
initializing the chip card to operate in a contactless mode for processing the contactless-type data and processing the contactless-type data in the contactless mode when the priority of the contact-type data is lower than the priority of the contactless-type data.

20. The method of claim 19, wherein the initializing comprises performing a warm-reset of the chip card.

21. A method for operating a chip card, the method comprising:
receiving contactless-type data from a contactless-type terminal;
initializing the chip card to operate in a contactless mode for processing the contactless-type data;
receiving contact-type data from a contact-type terminal, and checking priorities of the contactless-type data and the contact-type data when the contact-type data is received; and
ignoring the contact-type data when the priority of the contactless-type data is higher than the priority of the contact-type data and continuing to operate in the contactless mode, and initializing the chip card to operate in a contact mode for processing the contact-type data and processing the contact-type data in the contact mode when a priority of the contactless-type data is lower than a priority of the contact-type data.

22. The method of claim 21, wherein the processing of the contact-type data comprises switching from operating the chip with contactless-type power to operating the chip with contact-type power.

23. The method of claim 21, wherein the initializing comprises performing a warm-reset of the chip card.

* * * * *